United States Patent [19]

Formwalt, Jr.

[11] Patent Number: 5,498,929
[45] Date of Patent: Mar. 12, 1996

[54] VEHICLE LIGHTING ENHANCEMENT SYSTEM

[75] Inventor: Charles W. Formwalt, Jr., Janesville, Iowa

[73] Assignee: Deere & Company, Moline, Ill.

[21] Appl. No.: 500,292

[22] Filed: Jul. 10, 1995

[51] Int. Cl.⁶ ..................................... B60Q 1/00
[52] U.S. Cl. ......................... 315/77; 315/200 A; 315/81; 315/133; 315/65
[58] Field of Search ............... 315/200 A, 129, 315/130, 131, 76, 77, 82, 81, 132, 133, 65; 307/9.1

[56] References Cited

U.S. PATENT DOCUMENTS

| | | | |
|---|---|---|---|
| 4,939,503 | 7/1990 | Swanson | 315/77 |
| 5,027,031 | 6/1991 | Wheelock | 315/77 |
| 5,030,938 | 7/1991 | Bondzeit | 315/77 |

*Primary Examiner*—Robert J. Pascal
*Assistant Examiner*—Reginald A. Ratliff

[57] ABSTRACT

An implement lighting system providing enhanced turn signal warning with standard or enhanced tractor turn and warning lighting systems. The implement lighting system includes left and right brake lamps for connecting electrically to the ungrounded sides of the corresponding towing vehicle turn signal lamps. The implement lighting system also includes a control circuit which includes a plurality of diodes and a relay. If necessary for timing purposes, the control circuit may include a resistor and a capacitor.

8 Claims, 1 Drawing Sheet

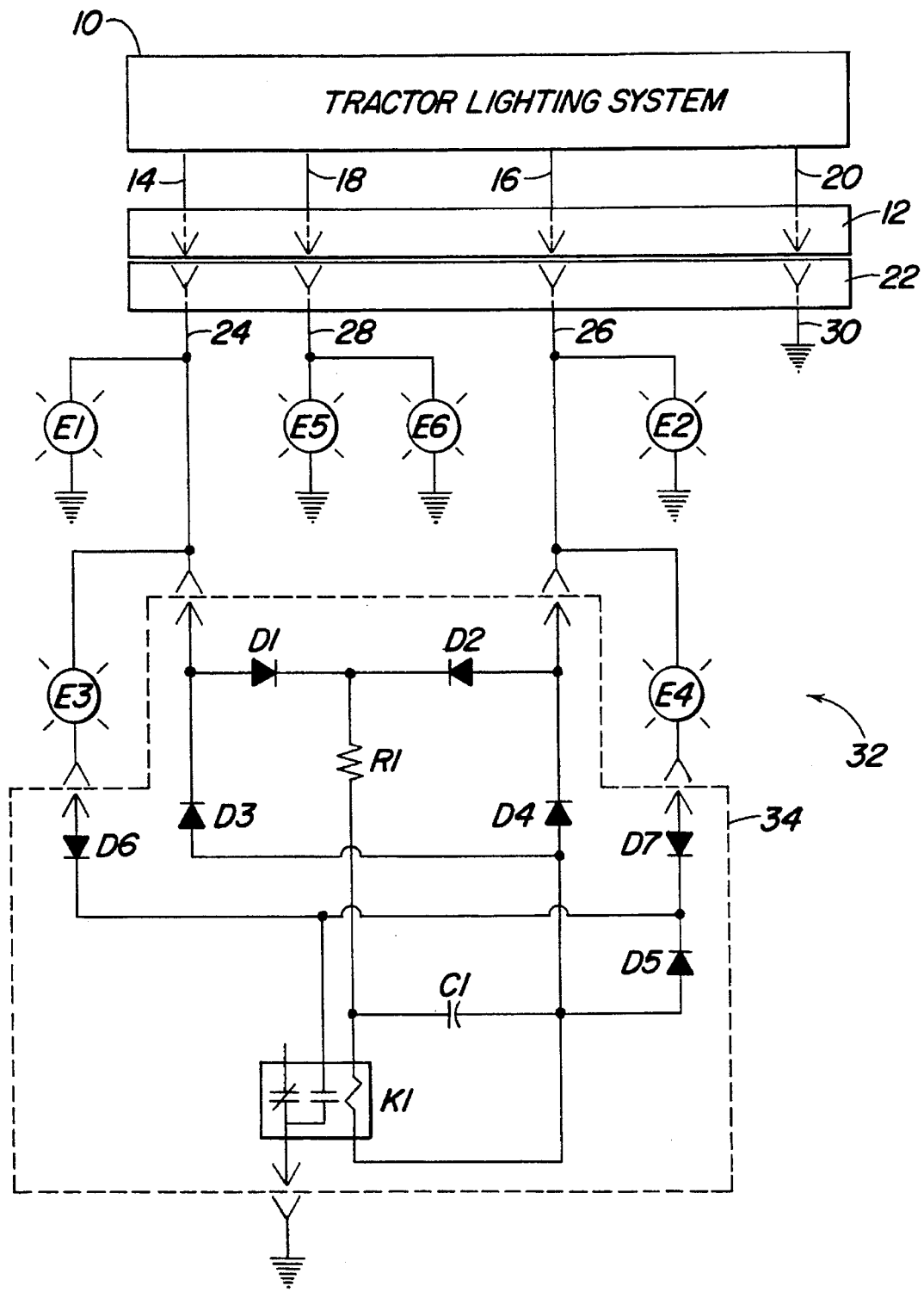

VEHICLE LIGHTING ENHANCEMENT SYSTEM

BACKGROUND OF THE INVENTION

The invention relates to a system for enhancing the lighting system of an implement pulled by a vehicle, such as a tractor.

Current production John Deere 7000 and 8000 Series Tractors have enhanced rear warning and turn signal systems in order to improve the likelihood that drivers following the tractors on the roadways will recognize when the tractor changes from a normal transport to a turning mode, especially a left turn mode. This enhanced lighting approximates the signal lighting on the rear of a passenger car. In the normal transport mode, amber lights flash on all four corners of the cab roof. In the turn signal mode, the flash rate of the roof lights increases on the side of the vehicle towards which the tractor is turning, while on the opposite side the roof lights remain steadily on. Also, with the enhanced system, red lamps are added at fender level, and these also flash on and off on the turning side and, on the opposite side, remain steadily on.

Most implements or towed vehicles, such as a planter or plow, etc., which are coupled to and pulled by a tractor, do not have this enhanced lighting functionality and such implments are typically connected electrically to the tractor electrical system via a standard 7-pin ASAE connector. It would be desirable to provide such an implement with enhanced lighting while still permiting use of the standard 7-pin ASAE connector.

SUMMARY OF THE INVENTION

Accordingly, an object of this invention is to provide a system which would provide enhanced lighting functionality for an implement which is towed behind a vehicle, such as a tractor.

A further object of the invention is to provide an implement with such enhanced brake and turn signal lighting while still allowing use of the industry standard 7-pin connector.

A further object of the invention is to provide the enhanced implement lighting with older vehicles or tractors that don't have enhanced turn signal lighting.

These and other objects are achieved by the present invention, wherein an implement lighting system enables lamps on a towed implement to function in the same manner as enhanced lightning on the towing vehicle or tractor. The implement lighting system includes left and right brake lamps for connecting electrically to the ungrounded sides of the corresponding towing vehicle turn signal lamps. The implement lighting system also includes a control circuit which includes a plurality of diodes and a relay. If necessary for timing purposes, the control circuit may include a resistor and a capacitor to prevent undesired energization of the relay.

BRIEF DESCRIPTION OF THE DRAWINGS

The sole FIG. 1 is a circuit schematic diagram of the present invention.

DETAILED DESCRIPTION

A conventional vehicle, such as a tractor (not shown) for towing a towed machine (not shown), such as an implement, includes a conventional known lighting system 10 which typically includes tail lamps, brake lamps and turn signal lamps (not shown). Such a tractor will also typically include a standard electrical connector 12. A left turn signal lamp conductor 14 connects the connector 12 to a left turn signal lamp (not shown) of the lighting system 10. A right turn signal lamp conductor 16 connects the connector 12 to a right turn signal lamp (not shown) of the lighting system 10. A tail lamp conductor 18 connects the connector 12 to the tail lamps (not shown) of the lighting system 10. A ground conductor 20 connects the connector 12 to the electrical ground (not shown) of the lighting system 10.

The vehicle lighting system 10 may include a known conventional turn signal lamp control system (not shown) wherein, when in a transport mode, the vehicle turn signal lamps (not shown) alternately flash on and off, and wherein, in a turning mode, the turn signal lamp (not shown) indicative of the turning direction flashes at a rate which is faster than the flashing rate in the transport mode, while the turn signal lamp (not shown) not indicative of the turning direction remains steadily on.

An implement or towed vehicle connector 22 is mated with the connector 12. Conductors 24, 26, 28 and 30 connect the connector 22 to an implement lighting system 32, and are connected to conductors 14, 16, 18 and 20, respectively, when connectors 12 and 22 are mated together. The connectors 12 and 22 are preferably the parts of a standard commercially available 7-pin ASAE connector.

A typical implement lighting system 32 includes a left amber lamp E1 which is connected to conductor 24, left and right tail lamps E5 and E6 which are connected to conductor 28, a right amber lamp E2 which is connected to the conductor 26 and a ground conductor 30.

According to the present invention, the implement lighting system is enhanced by the addition of a left brake lamp E3 (preferably red), a right brake lamp E4 (preferably red) and a control circuit module 34. The left brake lamp E3 should be connected electrically to the left turn signal lamp conductor 14 and can be mounted on a left portion of a towed vehicle (not shown). The right brake lamp E4 should be connected electrically to the right turn signal lamp conductor 16 and can be mounted on a right portion of the towed vehicle (not shown).

The control circuit module 34 includes a first diode D1 having an anode for connecting to the left turn signal lamp conductor 24, and a second diode D2 having an anode for connecting to the right turn signal lamp conductor 26 and having a cathode connected to a cathode of the first diode D1. For timing purposes explained below, the control circuit module 34 may also include a resistor R1 having one end connected to the cathodes of the first and second diodes D1 and D2. A third diode D3 has a cathode connected to the anode of the first diode D1. A fourth diode D4 has a cathode connected to the anode of the second diode D2 and has an anode connected to an anode of the third diode D3. A fifth diode D5 has an anode and a cathode. A sixth diode D6 has a cathode connected to the cathode of the fifth diode D5 and has an anode connected to the left brake lamp E3. A seventh diode D7 has a cathode connected to the cathodes of the fifth and sixth diodes D5 and D6 and has an anode connected to the right brake lamp E4. A relay K1 has a pair of normally open contacts, one of which is grounded and the other of which is connected to the cathodes of the fifth, sixth and seventh diodes D5, D6 and D7 and has a relay coil connected between the optional resistor R1 and the anodes of the third, fourth and fifth diodes D3, D4 and D5. An optional capacitor C1 may be connected in parallel with the relay coil of relay K1.

The lamps E3 and E4 function as additional or new red stop/turn lamp filaments. These can either be separate lamps or a second filament in a red tail lamp assembly. If they are a second filament, they must be a wedge-based lamp or another type that provides separate termination of both ends of both filaments.

Under normal transport flasher mode, relay K1 is deenergized, since both conductors 14 and 20 are both at either 12 V or off simultaneously, as amber lamps E1 and E2 flash alternately on and off. When the vehicle lighting system 10 changes to its right turn mode, conductor 14 will remain steadily at +12 V while conductor 16 alternates between +12 V and off. When the conductors 16 is off while conductor 14 is at +12 V, a path for K1 coil current is provided from conductor 24 through the diode D1, resistor R1, K1 coil, diode D4 and the filiments of the vehicle right turn signal lamps (not shown) and the implement right turn signal lamp E2. The lamp filament resistance is very low compared with the resistance of the relay coil and therefore approximates a direct connection to ground.

Once relay K1 is energized, its normally open contacts close and the lamps E1 and E3 are both essentially connected in parallel between 12v and ground. Because of the closed contacts in relay K1, there is now a continuous path for the relay coil current through diode D1 on the +12 V side and through diode D5 on the low side. The relay K1 will remain energized and lamps E1 and E3 will remain illuminated until the lamps on both the left and right turn off simultaneously, eliminating the +12 V supply for the relay coil, such as when the vehicle turn signal mode is completed. Once relay K1 is energized and the normally open contacts are closed, one side of right turn lamp E4 is connected to ground through diode D7. The other end of lamp E4 is connected to conductor 26 and is therefore connected in parallel with the amber right turn lamp, E2, flashing at the increased turn signal rate.

Similar operation occurs with respect to a left turn, except that the right implement lamps E2 and E4 remain steadily illuminated during the turn.

Resistor R1 and capacitor C1 are optional and may be included to assure that relay K1 doesn't become energized in the normal transport flashing mode as a result of slight timing differences in energization of the left and right lamp lines 14 and 16. Some production tractors have separate relays (not shown) to control left and right flashers (not shown) on the tractor (not shown). If these can be determined to pull in and drop out with less timing differential than the actuation time of relay K1, then capacitor C1 can be eliminated and resistor R1 can be replaced with a short circuit.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A towed vehicle lighting system for enhancing a lighting system of a towed machine, the towed machine lighting system having a first conductor for connecting to a left turn signal lamp conductor of a towing vehicle, a second conductor for connecting to a right turn signal lamp conductor of a towing vehicle, a left brake lamp connected to the first conductor and for mounting on a left portion of the towed machine, a right brake lamp connecting to the second conductor and for mounting on a right portion of the towed machine, and a control circuit comprising:

a first diode having an anode connected to the first conductor;

a second diode having an anode connected to the second conductor and having a cathode connected to a cathode of the first diode;

a third diode having a cathode connected to the anode of the first diode;

a fourth diode having a cathode connected to the anode of the second diode and having a cathode connected to an anode of the third diode;

a fifth diode having an anode and a cathode;

a sixth diode having a cathode connected to the cathode of the fifth diode and having an anode connected to the left brake lamp;

a seventh diode having a cathode connected to the cathodes of the fifth and sixth diodes and having an anode connected to the right brake lamp; and a relay having a pair of normally open contacts, one of which is grounded and the other of which is connected to the cathodes of the fifth, sixth and seventh diodes and having a relay coil connected between the cathodes of the first and second diodes and the anodes of the third, fourth and fifth diodes, the control circuit having a transport operational mode wherein both amber lamps are simultaneously flash on and off at a certain rate while the brake lamps are off, and the control circuit having a turning operational mode wherein the brake lamp indicative of a turning direction flashes at a rate which is faster than said certain rate and wherein the brake lamp not indicative of the turning direction remains steadily on.

2. The towed machine lighting system of claim 1, further comprising:

a resistor connected between the relay coil and the anodes of the first and second diodes; and a capacitor connected in parallel with the relay coil.

3. The towed machine lighting system of claim 1, wherein:

the left brake lamp is connected between the first conductor and the anode of the sixth diode; and the right brake lamp is connected between the second conductor and the anode of the seventh diode.

4. The towed machine lighting system of claim 1, wherein:

the anode of the first diode and the cathode of the third diode are connected to the first conductor; and the anode of the second diode and the cathode of the fourth diode are connected to the second conductor.

5. A towed machine lighting system for enhancing a lighting system of a towed machine, the towing vehicle lighting system including a left turn signal lamp conductor and a right turn signal lamp conductor, and the towing vehicle lighting system having a turn signal lamp control system wherein, when in a transport mode, the turn signal lamps alternately flash on and off, and wherein, in a turning mode, the turn signal lamp indicative of the turning direction flashes at a rate which is faster than the flashing rate in the transport mode, while the turn signal lamp not indicative of the turning direction remains steadily on, the towed machine lighting system comprising:

a left brake lamp for connecting electrically to the left turn signal lamp conductor and for mounting on a left portion of the towed vehicle;

a right brake lamp for connecting electrically to the right turn signal lamp conductor and for mounting on a right portion of the towed vehicle; and a control circuit comprising:

a first diode having an anode for connecting to the left turn signal lamp conductor;

a second diode having an anode for connecting to the right turn signal lamp conductor and having a cathode connected to an cathode of the first diode;

a third diode having a cathode connected to the anode of the first diode;

a fourth diode having a cathode connected to the anode of the second diode and having an anode connected to a anode of the third diode;

a fifth diode having an anode and a cathode;

a sixth diode having a cathode connected to the cathode of the fifth diode and having an anode connected to the left brake lamp;

a seventh diode having a cathode connected to the cathodes of the fifth and sixth diodes and having an anode connected to the right brake lamp; and a relay having a pair of normally open contacts, one of which is grounded and the other of which is connected to the cathodes of the fifth, sixth and seventh diodes and having a relay coil connected between the cathodes of the first and second diodes and the anodes of the third, fourth and fifth diodes.

6. The towed machine lighting system of claim 5, further comprising:

a resistor connected between the relay coil and the cathodes of the first and second diodes; and a capacitor connected in parallel with the relay coil.

7. The towed machine lighting system of claim 5, wherein:

the left brake lamp is for connecting between the left turn signal lamp conductor and the anode of the sixth diode; and the right brake lamp is for connecting between the right turn signal lamp conductor and the anode of the seventh diode.

8. The towed machine lighting system of claim 5, wherein:

the anode of the first diode and the cathode of the third diode are for connecting to the left turn signal lamp conductor; and the anode of the second diode and the cathode of the fourth diode are for connecting to the right turn signal lamp conductor.

* * * * *